Nov. 8, 1966

E. J. WORLEY 3,284,098

LOAD-TRANSFERRING AND OSCILLATION
DAMPING TRAILER HITCH

Filed Sept. 15, 1964

INVENTOR
EMMETT J. WORLEY
BY

Nov. 8, 1966

E. J. WORLEY 3,284,098

LOAD-TRANSFERRING AND OSCILLATION
DAMPING TRAILER HITCH

Filed Sept. 15, 1964

INVENTOR
EMMETT J. WORLEY
BY

United States Patent Office 3,284,098
Patented Nov. 8, 1966

3,284,098
LOAD-TRANSFERRING AND OSCILLATION
DAMPING TRAILER HITCH
Emmett J. Worley, 1320 W. Lincoln St.,
Mount Prospect, Ill.
Filed Sept. 15, 1964, Ser. No. 396,488
9 Claims. (Cl. 280—406)

The present invention relates to improvements in a trailer hitch assembly.

It is the principal object of this invention to provide a trailer hitch assembly which incorporates new and improved means for controlling excessive oscillation of the trailer as well as for relieving stresses normally transferred to the rear of the towing vehicle by the weight of the trailer and applying such forces to the front wheels of the towing vehicle.

A further object of this invention is to provide a trailer hitch assembly that is simple and practical in design and construction, strong and reliable in use, efficient and durable in operation, inexpensive to manufacture in quantity production and otherwise well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
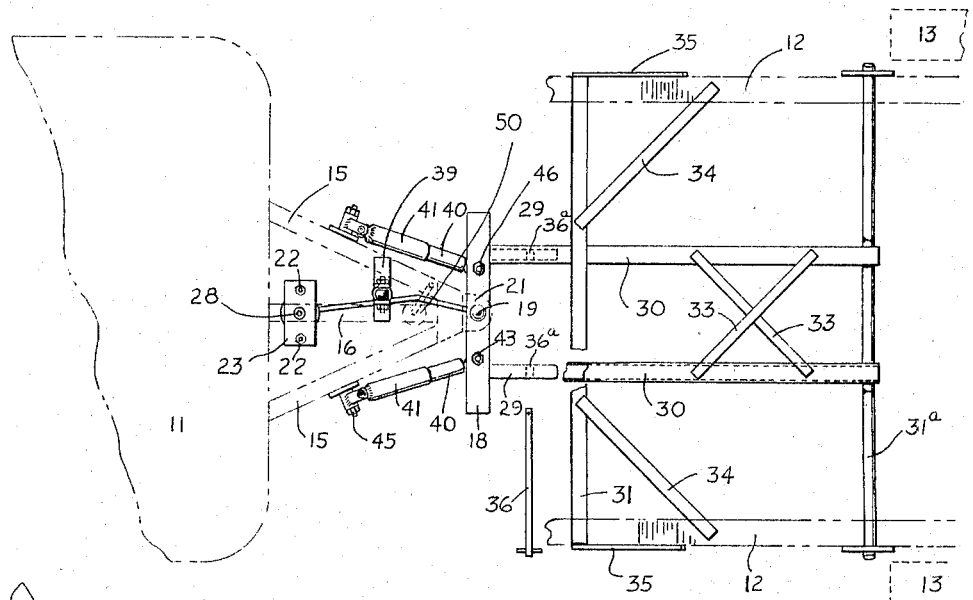
FIG. 1 is a fragmentary top plan view of a trailer hitch assembly as the same appears in installed relation to a trailer and a towing vehicle.
Figure 2:
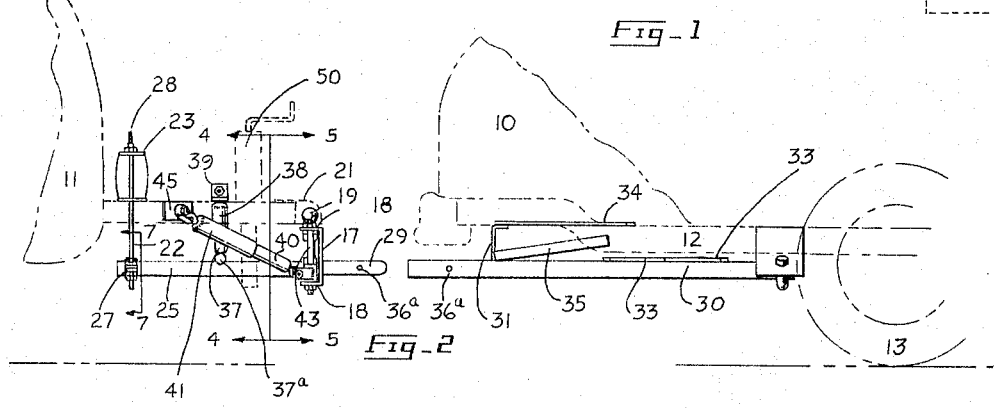
FIG. 2 is a side elevational view of the assembly shown in FIG. 1 as the same appears preparatory to establishing a towing connection between the trailer and the towing vehicle via said hitch assembly.

Referring more particularly to the drawings which accompany this application, a hitch assembly embodying the features of the present invention is shown in connection with a towing vehicle such as a conventional passenger automobile 10 and a trailer 11 of typical style and construction. The vehicle 10 is provided with an underframe having chassis members 12 extending in spaced apart relation lengthwise of the line of travel of wheels 13 of the vehicle 10 while the trailer 11 is likewise equipped with an underframe including chassis members which terminate in forwardly converging arms 15 in leading relation to the front end of the trailer 11 and a central brace member 16 to which the meeting front ends of the arms 14 are fixed to provide a rigid tongue in forwardly projecting relation to the front end of the trailer.

A channel member having a web 17 and a pair of opposed flanges 18 joined in spaced parallel relation by said flange 17 defines a hanger frame. The hanger frame is suspended from the trailer tongue for horizontal swinging movement about an axis parallel to the web 17 and for vertical swinging movement about an axis parallel to the flanges 18 via a hitch ball 19 fixed to the hanger member in concentric relation to an axis defined by a pivot pin 20 fixed to and joining said flanges of the hanger frame in spaced parallel relation to the web 17 and along a line perpendicular to the flanges 18 and midway of the length of the hanger frame, and a hitch ball receptacle 21 carried at the forward end of the trailer tongue in which the hitch ball is detachably engaged.

Figure 3:
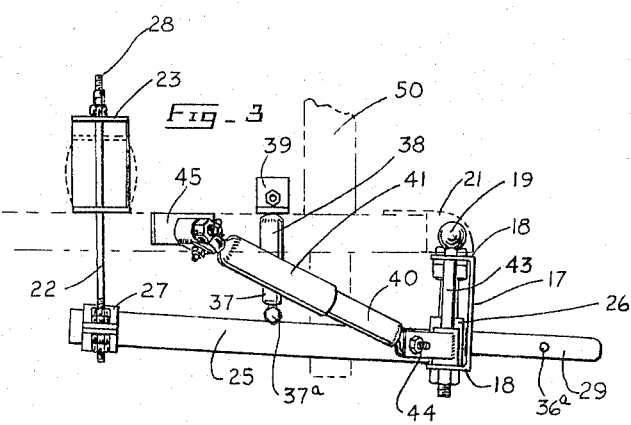
FIG. 3 is an enlarged view of the hitch assembly as shown in FIG. 2.
Figure 4:
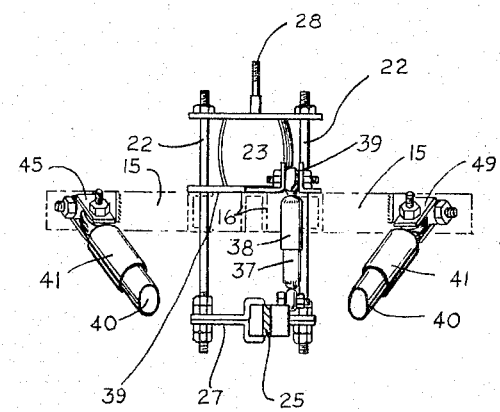
FIG. 4 is an enlarged vertical section taken along line 4—4 of FIG. 2.
Figure 6:
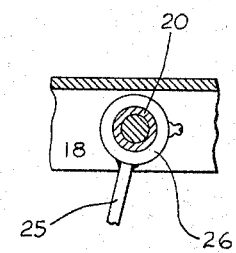
FIG. 6 is an enlarged horizontal section taken along line 6—6 of FIG. 2.
Figure 5:
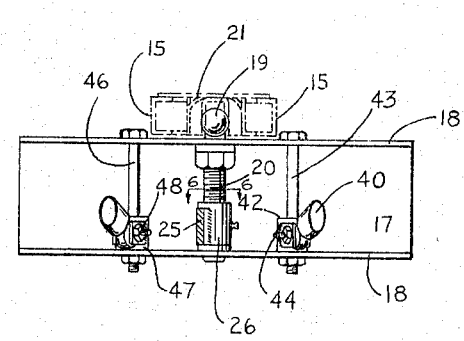
FIG. 5 is an enlarged vertical section taken along line 5—5 of FIG. 2.
Figure 7:
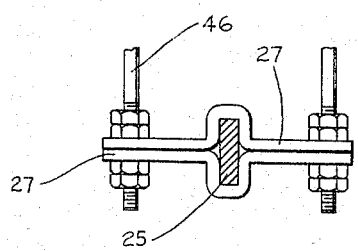
FIG. 7 is an enlarged vertical section taken along line 7—7 of FIG. 2.

A pair of rods each designated by reference numeral 22 are supported for movement between selected fixed positions downwardly of the trailer tongue in symmetrically arranged straddling relation to a vertical plane containing the central longitudinal axis of the brace member 16 of the trailer tongue. Such movement of the rods 22 is simultaneously controlled by a pneumatic power unit 23 mounted on and extending upwardly of the trailer tongue in rearwardly spaced relation to the intersection of the arms 15 and the central brace member 16 of the trailer tongue. The rods 20 are linked to the pivot pin 20 secured to the hanger member via a torsion rod 25. A bearing 26 at the forward end of the rod 25 receives the pivot pin 20 to establish a pivotal connection about which the hanger member may rotate horizontally relative to the torsion rod while the rear end of the rod 25 is connected to the rods 22 via a bracket 27 secured to the lower end portion of the rods 22 to fix the distance between the pivot pin 20 and the vertical path in which the rods 22 travel under control of the power unit 23. A slight clearance is provided between the rods 22 and the surfaces of the bracket 27 with which the rods 22 have engagement to compensate for the angular displacement of the torsion rod 25 incident to raising and lowering movement of the rods 22 under control of the penumatic power unit 23. Operation of the power unit to raise or lower the rods 22 is effected through admission of air to or discharge of air from the air containing cylinder of the power unit via a conventional form of air valve 28 projecting upwardly from the top of the power unit as shown in FIG. 3. The unit 23 is shown in dotted lines to indicate its retracted position while the portion in full lines indicates its advanced or elevated position effective to raise the rods 22.

A pair of shafts 29 are fixed to the hanger unit by a welded connection or other suitable means and occupy positions in forwardly projecting relation to the hanger web 17 along spaced parallel lines in horizontally aligned relation to a forward projection of the torsion rod 25 so as to have symmetrical straddling relation to a vertical plane containing such forward projection of the torsion rod 25. These shafts have telescopic engagement with tubular housing members 30 mounted in fixed relation to the under-frame of the vehicle 10 along lines in vertical alignment with the positions occupied by the shafts 29. It will be noted that the tubular housing members 30 project rearwardly of an overhead transverse supporting member 31 having opposite ends thereof welded or otherwise suitably secured to the chassis members 12 of the vehicle 10. A forward truss 31a likewise having opposite ends thereof suitably fixed to the chassis members 12 of the vehicle 10 in forwardly spaced parallel relation to the rear truss member 31 provides a rigid support to which the forward ends of the housing members 30 are suitably fixed. Diagonal braces 33 form fixed reinforcing members between portions of the housing members 30 located intermediate the front and rear truss members. Reference numeral 34 designates each of a pair of horizontally extending diagonal braces joining the rear truss member and the chassis members 12 of the vehicle 10 while numeral 35 represents each of a pair of vertically extending diagonal braces joining the rear truss member and the chassis mmebers 12. When the shafts 29 are operatively received in the housing members 30 a locking pin 36 fitting aligned openings in the housing members and the portion of the shafts 29 contained therein is effective to provide a detachable connection for preventing withdrawal of the shafts 29 from such operative telescoped engagement with the housing members 30 and accordingly establish rigid interconnection between the hanger member of the trailer hitch assembly and the towing vehicle.

While the pneumatic force applied via the power unit 23 is operative to dampen vertical oscillation of the trailer hitch assembly about the hitch ball 19 through the connection of the threaded rods 22, bracket 27, torsion rod 25, pivot pin 20 and the hanger member on which the pivot pin 20 is fixed, such oscillation is further controlled by a hydraulic fluid containing cylinder 37 having a piston rod 38 extending from one end thereof. The cylinder 37 is connected to the torsion rod 25 via a pivotal connection 37ª as shown in FIG. 3 approximately midway of the distance between the rods 22 and the pivot pin 20 while the piston 38 is pivotally connected to the trailer tongue in substantially upright relation to the torsion rod 25 via a bracket 39 secured to the trailer tongue.

Additional control of oscillation of the trailer hitch assembly about the hitch ball 19 is obtained via a pair of hydraulic units linking the trailer tongue to the lower flange 18 of the hanger member. Each of said hydraulic units includes a fluid containing cylinder 40 having a piston rod 41 extending from one end thereof. A bracket 42 having pivotal connection with the hanger member via a pivot bolt 43 extending between the flanges 18 of the hanger member in uniform straddling relation to the pivot bolt 20 is joined by a horizontal pivot bolt 44 to the piston rod of one of the cylinders 40 while said cylinder has vertical as well as horizontal pivotal connection with an arm 15 of the trailer tongue via a bracket mounting 45. A second pivot bolt 46 extending between flanges of the hanger member in spaced parallel relation to the pivot bolt 20 in a direction from the latter bolt 20 away from the position occupied by the pivot bolt 43 is joined to the piston rod of the other cylinder 40 via a bracket 47 and a pivot bolt 48, while the latter cylinder has vertical as well as horizontal pivotal connection with an arm 15 of the trailer tongue via a bracket mounting 49. It will be noted that the hydraulic units thus provide duplicate adjustable links between the hanger member and the trailer tongue along lines extending in uniformly and rearwardly diverging relation to a vertical plane containing the longitudinal axis of the trailer tongue and in rearwardly and upwardly inclined relation to the lower flange of the hanger member. Each of the cylinders 40 have fluid flow restricting means for impeding movement of the piston rod in a direction outward of the cylinder to a greater extent than movement of the rod into said cylinder. Thus movement of the rod of the cylinder in outside relation to the turn being made by the trailer in response to turning of the towing vehicle applies resistance which is effective to avoid side thrust or outward sway upon the towing vehicle incident to making such a turn. It should be noted that forces which tend to apply bending stress on the torsion bar as well as forces which act on the torsion bar in excess of the resistance offered by the pneumatic power unit are effectively counteracted by the cylinder 38 because of its location in relation to the midsection of the torsion bar.

In preparing to connect the trailer 11 and vehicle 10 via a hitch assembly as heretofore described, the power unit 23 is operated to lower the rods 22 and thereby act to locate the shafts 29 at a level in alignment with the housing members 30 so as to allow the latter to telescope the shafts 29 as the rear of the vehicle 10 is brought into a position sufficiently close to the trailer to accomplish such telescopic engagement between the members 30 on the vehicle and the shafts 29 projecting forwardly from the trailer hitch. Having thereupon inserted the locking pin 36 into the alignment openings in the shafts 29 and the housing members 30 so as to prevent withdrawal of the shafts 29 from said members 30, the power unit 23 is operated to raise the rods 22 and thereby exert an upward thrust at the hanger so as to elevate the shafts 29 and the housing members 30. Such elevating of the rods 22 accordingly acts to hold the rear of the vehicle at a level effective to transmit a part of the load of the trailer from the rear wheels 30 of the vehicle 10 to the front wheels of the vehicle.

The use of a pneumatic power unit 23 not only aids the operator in positioning and holding the vehicle 10 at a substantially level or horizontal position but also functions to cushion vertical oscillation of the trailer 11 relative to the vehicle 10 so as to improve riding conditions of the vehicle and trailer while in transit over rough terrain.

While a preferred embodiment of the invention has been illustrated and described herein, it will be understood that changes in the construction may be made within the scope of the claims appended hereto without departing from the spirit of the invention.

Having fully described the invention, what is claimed as new and desired to secure by Letters Patent is:

1. A hitch assembly for establishing a flexible connection between the forwardly projecting tongue of a trailer and a towing vehicle for movement of said trailer and said vehicle in unison in varying degrees of unalignment including right and left turns over uneven terrain, said assembly including a hanger member pivotally suspended from the forward end of said trailer tongue, a torsion bar, means for pivotally connecting one end of said torsion bar to said hanger member in downward coaxial alignment with the axis on which said hanger member has horizontal pivotal movement relative to said trailer tongue and means supporting said torsion bar at its other end in rearwardly spaced relation to said hanger member and in downwardly spaced vertical alignment with the center line of said trailer tongue, and means for controlling rolling or pivoting action of said hanger member relative to said trailer tongue including a pair of hydraulic fluid containing cylinders, each of said cylinders containing a piston having a piston rod extending from one end thereof, and fluid flow restricting means for impeding movement of said piston rod out of its associated cylinder to a greater extent than into said cylinder, connecting means between said cylinders and said trailer tongue and said hanger member through which the axes of said cylinders occupy positions in uniformly rearwardly diverging relation to a vertical plane containing the center line of said trailer tongue and in rearwardly and upwardly inclined relation to the connection between said cylinders and said hanger member, and means operatively connecting said hanger member and said towing vehicle.

2. A hitch assembly according to claim 1 wherein means for controlling rolling or pivoting action of said hanger member relative to said trailer tongue includes a third hydraulic fluid containing cylinder and connecting means between said third cylinder and said trailer tongue and said torsion bar operate to establish the position of said third cylinder in a vertical plane parallel to a vertical plane containing the center line of said trailer tongue.

3. A hitch assembly according to claim 2 wherein said connecting means between said third cylinder and said torsion bar is located midway of the distance between said opposite ends of said torsion bar.

4. A hitch assembly according to claim 1 wherein said torsion bar supporting means provides a vertically adjustable connection between the trailer tongue and the torsion bar.

5. A hitch assembly according to claim 1 wherein said torsion bar supporting means includes a pneumatic power unit secured to said trailer tongue.

6. A hitch assembly according to claim 1 wherein said torsion bar supporting means includes a bracket fixed to said torsion bar, a rod having threaded connection with said bracket, and a pneumatic power unit secured to said trailer tongue operating to raise and lower said rod between selected positions downwardly of said trailer tongue.

7. A hitch assembly according to claim 1 wherein a telescopic coupling provides a rigid connection between said hanger member and the vehicle with which said hitch assembly is operatively associated.

8. A hitch assembly according to claim 1 wherein said hanger member is provided with a pair of shafts fixed to said hanger member in forwardly projecting relation thereto along lines in uniformly straddling relation to the axis on which said hanger member has vertical pivotal movement relative to said trailer tongue, and a telescopic coupling with said shafts provides a rigid connection between said hanger member and the vehicle with which said hitch assembly is operatively associated.

9. A hitch assembly according to claim 1 wherein said hanger member is provided with a pair of flanges and a connecting web through which said flanges are positioned in rearwardly extending parallel relation, and said pivotal connection between said hanger member and said torsion bar includes a pivot pin secured to said flanges in rearwardly spaced relation to said connecting web.

References Cited by the Examiner

UNITED STATES PATENTS

| | | | |
|---|---|---|---|
| 2,772,098 | 11/1956 | Seeley | 280—406 |
| 2,772,893 | 12/1956 | Wettstein | 280—406 |
| 2,789,834 | 4/1957 | Chism | 280—406 |
| 2,808,272 | 10/1957 | Reese | 280—406 |
| 2,918,308 | 12/1959 | Lowman | 280—406 |

LEO FRIAGLIA, *Primary Examiner.*